W. GLAZE.
Wagon-Brake.
No. 42,468
Patented Apr. 26, 1864.
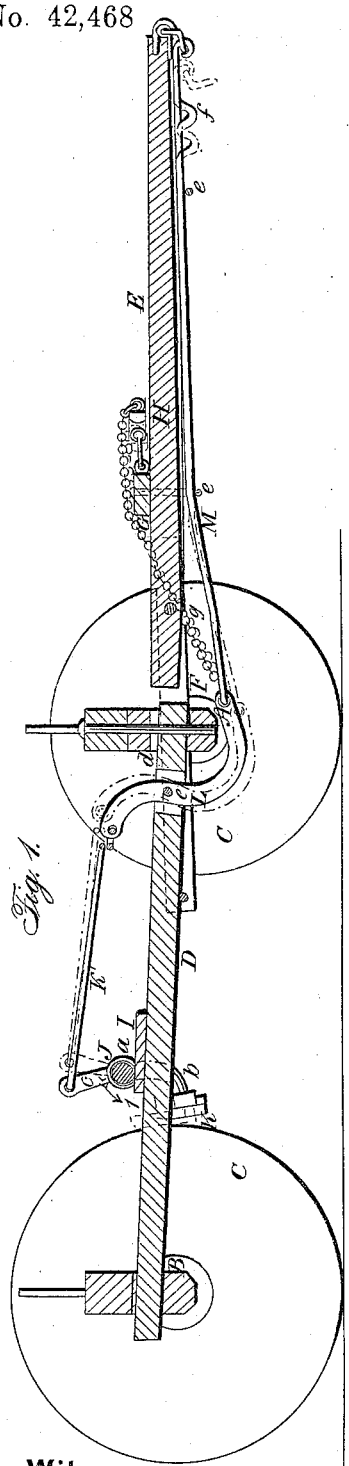
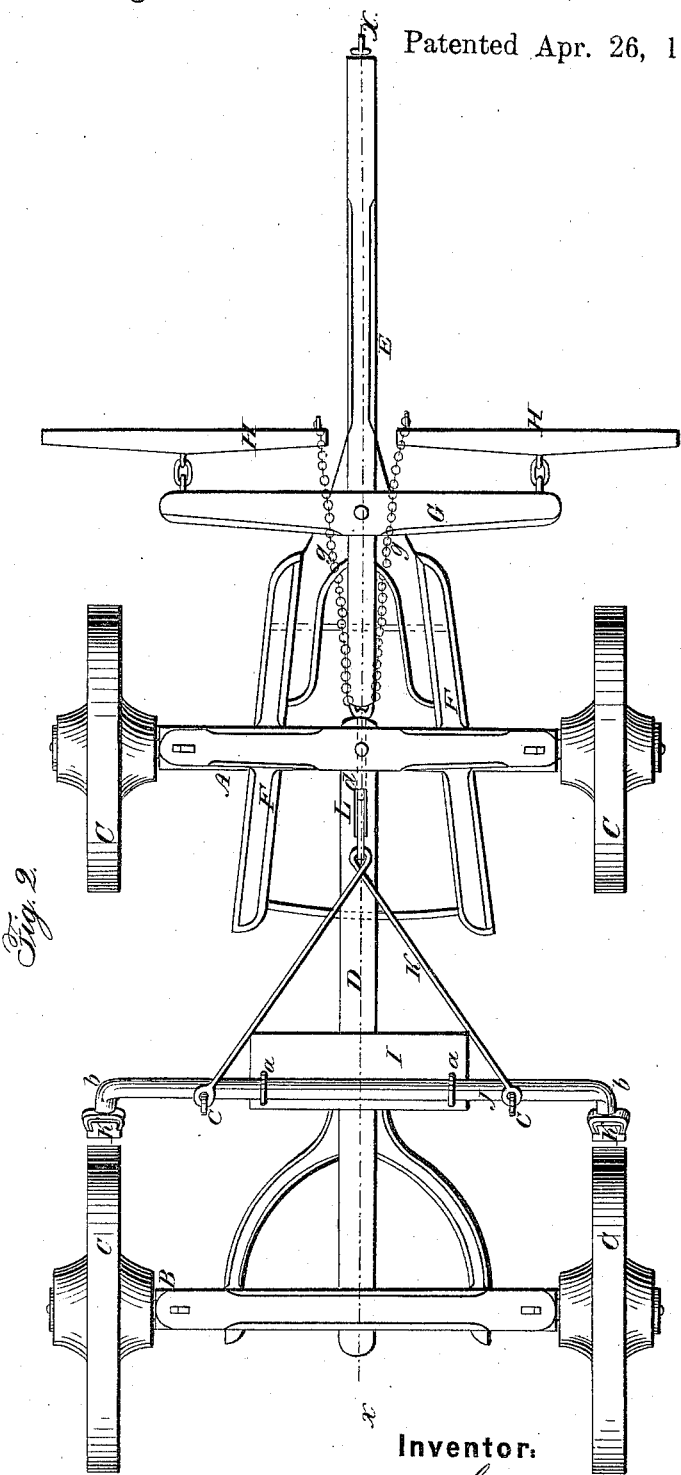
Witnesses:
J. W. Coombs
Geo. W. Reed
Inventor:
Willis Glaze
per Munn & Co.
Attorneys

UNITED STATES PATENT OFFICE.

WILLIS GLAZE, OF ROCHESTER, INDIANA.

IMPROVEMENT IN SELF-ACTING BRAKES.

Specification forming part of Letters Patent No. 42,468, dated April 26, 1864.

*To all whom it may concern:*

Be it known that I, WILLIS GLAZE, of Rochester, in the county of Fulton and State of Indiana, have invented a new and Improved Self-Acting Brake for Wheel-Vehicles; and I do hereby declare that the following is a full, clear, and exact description of the same, reference being had to the accompanying drawings, making a part of this specification, in which—

Figure 1 is a side sectional view of my invention, taken in the line $x$ $x$, Fig. 2; Fig. 2, a plan or top view of the same.

Similar letters of reference indicate corresponding parts in the two figures.

This invention consists in connecting the brake-bar with the whiffletrees of the vehicle, and also with the breast-straps or neck-yoke of the team, in such a manner that the brakes will be applied to the wheels when the vehicle is passing down or over descending ground, or whenever the speed of the team is checked or "reined in," to stop or retard the movement of the vehicle, and the brakes instantly moved or thrown off from the wheels whenever the draft power of the team is applied to the vehicle.

To enable those skilled in the art to fully understand and construct my invention, I will proceed to describe it.

A represents the front and B the back axle of a vehicle. C are the wheels; D, the reach or perch; E, the draft-pole; F, the hounds; G, the double-tree, and H H the whiffletrees. These parts may all be constructed in the usual way, and therefore do not require a minute description.

On the reach or perch D there is secured a bar or plate, I, on which the bearings $a$ of a shaft, J, are attached, the latter being allowed to turn freely in the former, and having its ends turned or bent downward, so as to be nearly or about at right angles with its main portion, as shown at $b$ $b$, said parts $b$ having each a shoe, K, attached to it, which shoes, when the shaft J is turned in the proper direction, will bear against the back wheels, C.

The shaft J has two arms, $c$ $c$, projecting from it, and these arms are connected by a V-shaped rod, K', with the upper end of a lever, L, which is fitted in a mortise, $d$, in the reach or perch D, the fulcrum-pin $e$ passing horizontally through the reach or perch. This lever L may be of any suitable curved form to prevent it in its working from coming in contact with any of the contiguous parts of the vehicle, and the lower end of said lever is connected to a rod, M, which is fitted in guides $e$, attached to the under side of the draft-pole E, the rod M near its front end being bent or curved to form a pendent projection, $f$. (See Fig. 1.) The lower end of the lever L is also connected by chains $g$ $g$ to the inner end of each whiffletree H.

The operation is as follows: When the machine is being drawn along, the shoes K are kept out or off from the back wheels, C, in consequence of the whiffletrees H being connected to the lower end of the lever L by the chains $g$ $g$, the fall of which draws forward the lower end of said lever, and consequently shoves backward its upper end, which causes the rod K' to turn the shaft J in the direction indicated by arrow 1. (See Fig. 1.) When, however, the vehicle is descending an eminence, the neck-yoke will bear against the projection $f$, and hold said rod or prevent it from moving forward, while the wagon will be impelled forward by its own gravity, the team holding back or checking said movement in consequence of the neck-yoke bearing against the projection $f$ of the rod M, and the lever L will be moved to the position shown in red outline, and the shaft J turned so that the shoes K will bear or press against the back wheels, C. Thus it will be seen that when the vehicle is drawn forward the shoes will be thrown out from the back wheels, C, and pressed against them when the vehicle is descending an eminence. At any time when it is not required to have the shoes act against the wheels—as in backing the vehicle, for instance—the front end of the rod M may be attached to the front end of the draft-pole E by a hook, $h$, and the brake attachment thereby rendered inoperative.

I do not claim the brake attachment composed of the rod M, lever L, rod K', and shoe-shaft J, for that has been previously used. Neither do I claim, broadly, the use of a lever in such connection; but I do claim as new and desire to secure by Letters Patent—

The combination of the hook $h$, rods M and K, projection $f$, guides $e$ $e$, levers L $c$ $c$, shaft J, chains $g$ $g$, and whiffletrees H H, all constructed and operating in the manner and for the purpose specified.

WILLIS GLAZE.

Witnesses:
A. J. HOLMES,
MILO R. SMITH.